March 6, 1951     F. S. PEARNE     2,544,039
AUTOMOBILE LIFT
Filed Feb. 10, 1948
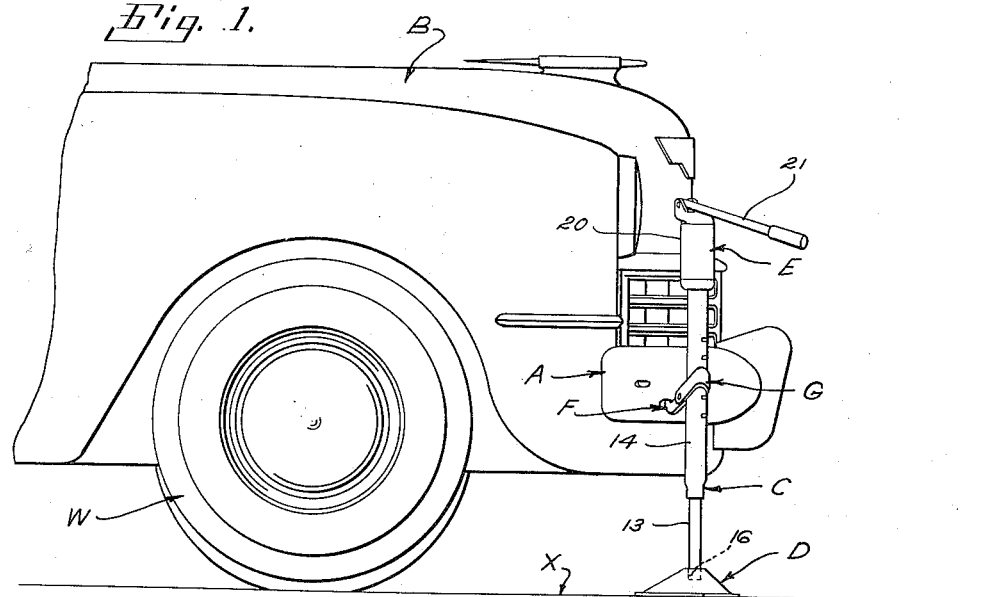
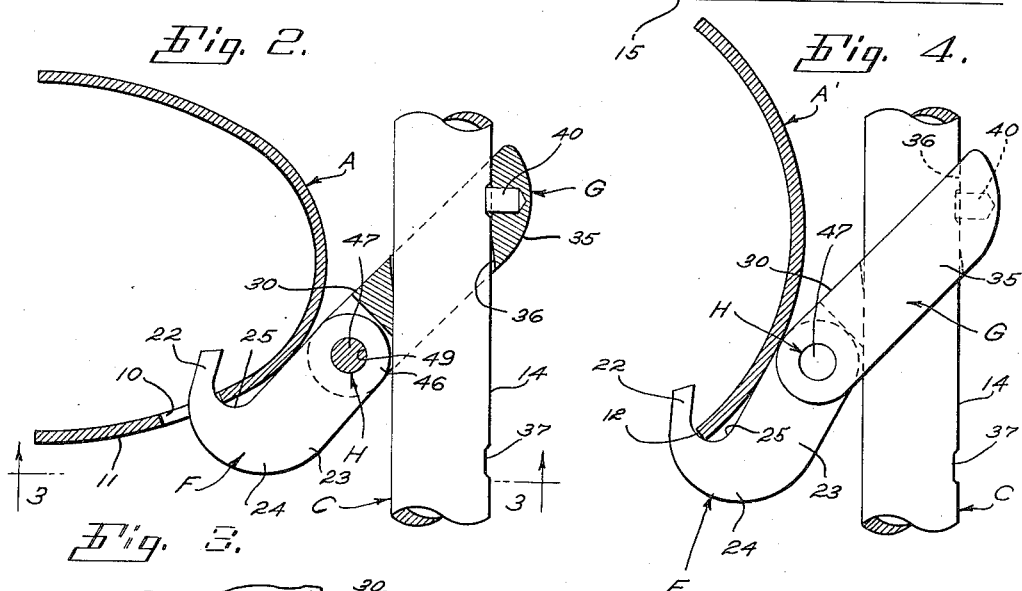
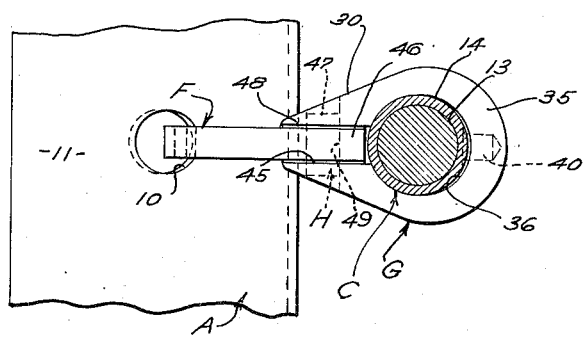
INVENTOR
FRANK S. PEARNE
BY
ATTORNEY Patented Mar. 6, 1951

2,544,039

UNITED STATES PATENT OFFICE 2,544,039

AUTOMOBILE LIFT

Frank S. Pearne, Alhambra, Calif.

Application February 10, 1948, Serial No. 7,342

6 Claims. (Cl. 254—134)

This invention is concerned with an automobile lift in the general nature of a jack, and it is an object of the invention to provide a simple compact structure that will effectively and dependably handle an object such as an automobile.

Automobiles are in many cases so designed that it is exceedingly difficult to engage a jack beneath an axle for the purpose of lifting a wheel, while at the same time they are equipped with sturdy bumpers which are coupled to the frame and which can be engaged by a lift or jack.

Jacks heretofore provided for lifting automobiles by means of the bumpers have been characterized by a vertical extensible support carrying a hook which engages the bumper. This type of hook has been constructed as a rigid element projecting from the support in a manner to effectively engage a bumper and with such a structure the center of load is offset a substantial distance from the vertical axis of the support with the result that the edge portion of the base beneath the hook is subject to excessive pressure and there is a marked tendency for the support to flex or bend and thus further aggravate the offset condition.

It is a general object of the present invention to provide a lift or jack including a vertically extensible support which carries a hook in such manner that the loads supported through the hook is imparted to the support at a point close to the vertical axis of the support. With the construction of the present invention the load is communicated by the hook to the support at a point so close to the vertical axis of the support that the load is substantially uniformly applied to the base and there is but little tendency for the support to bend or be deflected from a truly vertical position.

Another object of the present invention is to provide a structure of the general character referred to wherein there is a bracket carried by the support and a pivotal connection between the bracket and hook which allows the hook to pivot relative to the bracket and thus center or accommodate itself to the object engaged, for example, to the bumper, as the structure is operated.

Another object of the present invention is to provide a construction of the general character referred to which is characterized by few simple inexpensive parts which serve to form a practical, yet highly effective mechanism.

The various objects and features of my invention will be fully understood from the following detailed description of a typical preferred form and application of my invention, throughout which description reference is made to the accompanying drawings, in which:

Fig. 1 is a side elevation of the forward end portion of a typical motor vehicle having a bumper and showing a bumper engaged by a lift or jack provided by the present invention. Fig. 2 is an enlarged detailed sectional view of a portion of the structure shown in Fig. 1, showing in detail the manner in which the bumper is engaged by the hook of the jack and showing a typical case wherein the bumper has an opening or aperture in which the hook of the jack may be engaged. Fig. 3 is a view of the parts shown in Fig. 2 taken as indicated by line 3—3 on Fig. 2, and Fig. 4 is a view similar to Fig. 2 showing the hook engaged with a bumper which is somewhat different in form from the bumper shown in Fig. 2, and illustrating a situation in which the hook engages under the lower edge portion of the bumper.

The lift or jack provided by this invention may be used to advantage under various conditions. However, it is particularly useful and practical as applied to motor vehicles or automobiles in connection with which it can be operated to engage a bumper so that the automobile is lifted through or by means of the bumper. Because the present invention is particularly useful and practical in such a situation, it may be termed or classified as what is known in the trade as a bumper jack.

Automobiles, as now manufactured, have both front and rear bumpers which are rigid sturdy elements anchored or secured to the frame of the vehicle. Automobile bumpers vary somewhat in form or design with the result that a bumper jack such as is provided by the present invention will not engage on all bumpers in exactly the same manner. In the drawings I have shown two typical adaptations of the present invention to automobile bumpers.

In Fig. 2 I show a situation where the hook of the jack is engaged with the bumper A of a motor vehicle B by engaging the hook in a hole or aperture 10 in the lower portion 11 of the bumper. In Fig. 4 of the drawings I show a bumper A' that is without an aperture or opening and in this case the hook of the jack is engaged with or under the lower edge 12 of the bumper. It will be apparent from analysis of Figs. 2 and 4 of the drawings that the jack construction that I have provided works equally well and with the same advantage whether applied to a bumper such as shown in Fig. 2 or to a bumper such as shown in Fig. 4.

The construction embodying the present invention involves, generally, an extensible support C, a base D carrying the support, means E for operating the support, a hook F engageable with a bumper or the like, a bracket G on the support and means H pivotally connecting the hook F and the bracket G.

Elements of the construction such as the support C, base D and means E may, so far as my invention is concerned, be varied widely in form and construction. In the drawings I have shown a structure wherein such elements are of the general form or type set forth and claimed in my copending application on "Hydraulic Jack" Serial No. 739,833, filed April 7, 1947.

The support C shown in the drawings, for purpose of example, is an elongate structure vertically disposed when in operation, and it involves, generally, two telescopically related sections, one a ram 13 and the other a cylinder 14. In the case illustrated the ram is round in cross section and has its lower end engaged with the base D. The cylinder 14 is a tubular part slidably engaged on or fitting over the ram. In operation the ram 13 is carried by the base D so that it is stationary while the cylinder 14 operating on the ram moves up and down in response to operation of means E.

The base D is preferably in the form of a foot or platform having a flat bottom 15 engageable with the ground X or other like support. In the case illustrated the base is shown with a socket 16 receiving and holding the lower end of the ram 13 so that when the base is resting on a horizontal support the ram is held so that it projects vertically upward from the base.

The means E provided for operating the support C is shown as including a suitable pump unit 20 including a reservoir and having a suitable operating lever 21 by which the pump may be actuated. In carrying out the present invention the pump unit 20 may be of the form and construction that is set forth in the above-mentioned copending application.

The hook F provided by the present invention is preferably a simple upwardly faced hook. As shown in the drawings the hook is preferably formed of flat stock of uniform thickness with an outer or nose portion 22 joined to a shank 23 by a curved neck 24. The shank 23 is a sturdy or rigid portion of the hook that extends upwardly usually at an angle to the point where its upper end is joined to the bracket G by the means H. The hook F is preferably disposed in a vertical plane, its shank 23 being of a height equal to the thickness of the bracket G. The outer or nose portion 22 of the hook is shown as somewhat smaller in size than the shank so that it may be readily engaged in an opening or aperture 10 of limited size. It is to be observed from the drawings that the portions 22, 23 and 24 form or define an upwardly facing concave seat 25 in which a part or edge of a bumper rests when the structure is in operation, as shown in Figs. 2 and 3 of the drawings.

The bracket G may in practice be carried on or secured to the support C in any suitable manner, and is characterized by a laterally projecting lug 30 to which the shank 23 of the hook F is connected by the means H. In the preferred form of the invention the bracket G is adjustable on or along the cylinder 14 of support C so that the hook supporting lug of the bracket may be located at various positions above or relative to the base D.

In the particular case illustrated the bracket G has a main or body portion 35 of substantial vertical thickness or height with an opening 36 formed through it and passing the cylinder of the support. The substantial thickness or height of the body 35 provides long bearing contact between the body and the cylinder. The opening 36 may be a bore or round opening that extends through the body 35 at an angle or so that it is inclined to the general plane of the body. The opening 36 passes the cylinder 14 with suitable working clearance. The forward top and lower rear walls of the opening 36 are relieved or enlarged laterally, as shown in Fig. 2, so the body 35 can be tilted or worked somewhat relative to the cylinder, as will be hereinafter described. The lug 30 of bracket G projects from one side of the body 35 and in accordance with the preferred arrangement the lug projects from the lowermost side or portion of body 35. As will be noted from the drawings the opening 36, being at an angle, the body is carried on the cylinder so that it is pitched or at an angle having its lug carrying portion considerably lower than the diametrically opposite portion. The opposite upper and lower relief or enlargement of the opening 36 provides means for releasing the body for free vertical adjustment upon the support.

A body 35 engaged on the cylinder 14 in the manner just described may bind or lock itself against movement along the body when load is applied to the structure. However, I prefer to provide a positive lock to prevent shifting of the body along the cylinder except when it is desired to intentionally shift the body on the cylinder. The lock means that I have shown in the drawings involves a lock pin 40 carried by the uppermost portion or at the uppermost part of body 35 to have a portion projecting into the opening 36 to be engageable in one of several recesses 37 in the side of cylinder 14. The opening 36 is of such size and shape as to allow the body 35 to be rocked somewhat relative to the cylinder 14 in order to disengage the pin 40 from a recess in which it had been engaged and when the pin is disengaged the body is free to be moved to any desired position lengthwise of the cylinder.

The pivotal connection H provided between the hook and the bracket may vary widely in form and construction. In the particular case illustrated the lug 30 of the bracket is shown provided with a notch 45 that receives the upper end portion 46 of shank 23. A horizontal pivot pin 47 is carried by the lug to extend through the notch 45 and through an opening 49 provided in the portion 46 of shank 23. In practice I may insert one or more friction washers 48 in the notch 45 to establish suitable friction between the shank and the lug so that the hook will normally remain in any position to which it may be moved while at the same time it is free to pivot or turn and thus accommodate itself to forces set up as the structure operates.

From the foregoing description it will be apparent that the jack provided by the present invention may be arranged at or adjacent a bumper with the hook F of the jack hooked to the bumper. With the hook of the jack engaged with or under a part of the bumper in a manner such as I have illustrated in the drawings, operation of the means F to move the cylinder 14 upward causes the hook to fit or accommodate itself to the bumper and to be, in effect, a part of the bumper communicating load to the bracket G through the pivotal connection H.

Throughout operation the load applied to the bracket G is communicated through the means H so that the center of load or downward pressure carried by the support C and the base D is always or constantly through a vertical center intersecting the connection H. It is to be observed that the lug 30 of the bracket G projects only far enough from the side of cylinder 14 to properly carry the hook, with the result that the center of load is located close to the vertical axis of the support C so that there is a minimum tendency for the structure to tilt or for the support C to flex or bend. It is further to be noted that through the pivotal hook construction that I have provided the jack may be safely operated by accommodating it to a bumper or the like to provide a secure fastening between the jack and bumper.

With the jack engaged with a bumper through the hook construction above described, and with the center of load maintained close to the vertical axis of the support C the jack can be readily operated to lift and lower a bumper and, consequently, the wheel W of a vehicle, with a minimum danger of straining or flexing parts of the jack and with a minimum danger of the jack slipping or becoming in any way fouled as sometimes occurs in the course of operating structure of this character.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A jack including a vertically disposed extensible support, a bracket having an opening passing the support disposed so the bracket extends at an angle to a plane normal to the longitudinal axis of the support, a lug at the lowermost portion of the bracket, a lock pin projecting from the bracket at the upper portion thereof and into the opening to be engageable with the support, a hook, and a pivot pin pivotally connecting the hook to the lug.

2. A jack including, a base, a ram projecting upwardly from the base, a cylinder operable on the ram and having longitudinally spaced indentations therein, a pump operable to actuate the cylinder on the ram, a bracket slidable along the cylinder and disposed at an angle to a plane normal to the longitudinal axis of the cylinder and having a projecting lug with a vertically disposed notch therein, a lock pin projecting from the bracket selectively engageable in an indentation to hold the bracket against movement along the cylinder, a hook, and a horizontally disposed pivot pin connecting the hook to the lug clear of the cylinder.

3. A jack including an extensible support, a flat bracket having an opening extending therethrough at an angle and slidably passing the support so the bracket is in a plane pitched to a plane normal to the axis of the support, a work engaging hook carried by the bracket at the lowermost portion thereof and spaced from said opening, and a lock member carried by the bracket and cooperating with the support, said member being held engaged with the support by downward pressure applied to the bracket through the hook.

4. A jack including an extensible support, a flat bracket having an opening extending therethrough at an angle and slidably passing the support so the bracket is in a plane pitched to a plane normal to the axis of the support, a work engaging hook carried by the bracket at the lowermost portion thereof and spaced from said opening, and a lock pin carried by the bracket projecting into the opening and cooperating with the support, said member being held engaged with the support by downward pressure applied to the bracket through the hook.

5. A jack including an extensible support, a flat bracket of substantial thickness and having an opening extending therethrough at an angle and slidably passing the support so the bracket is in a plane pitched to a plane normal to the axis of the support, a work engaging hook carried by the bracket at the lowermost portion thereof and spaced from said opening, and a lock member carried by the bracket and cooperating with the support, said member being held engaged with the support by downward pressure applied to the bracket through the hook, the opening being relieved from its ends at opposite sides for rocking movement on the support to engage and disengage the lock member.

6. A jack including an extensible support with a tubular part with longitudinally spaced indentations, a flat bracket of substantial thickness with an inclined opening through it from one side to the other slidably passing said tubular part, the opening being relieved from its upper and lower sides at diametrically opposite points, there being a notched lug projecting from the bracket at the lowermost portion thereof, a lock pin carried by the bracket projecting into the opening at an unrelieved portion thereof and movable into and out of engagement with the indentations in said part by rocking of the bracket on the support, the pin being at the upper portion of the bracket remote from the lug, a flat vertically disposed hook with a shank engaged in the notch of the lug, and a horizontally disposed pivot pin connecting the hook and lug with the hook clear of the support.

FRANK S. PEARNE.

REFERENCES CITED

The following references are of record in the file of this patent:

UNITED STATES PATENTS

| Number | Name | Date |
| --- | --- | --- |
| 2,107,717 | Smith | Feb. 8, 1938 |
| 2,259,789 | Akins | Oct. 21, 1941 |